W. A. KLINGBERG.
WINDOW SHIELD.
APPLICATION FILED OCT. 29, 1917.
1,279,879.
Patented Sept. 24, 1918.
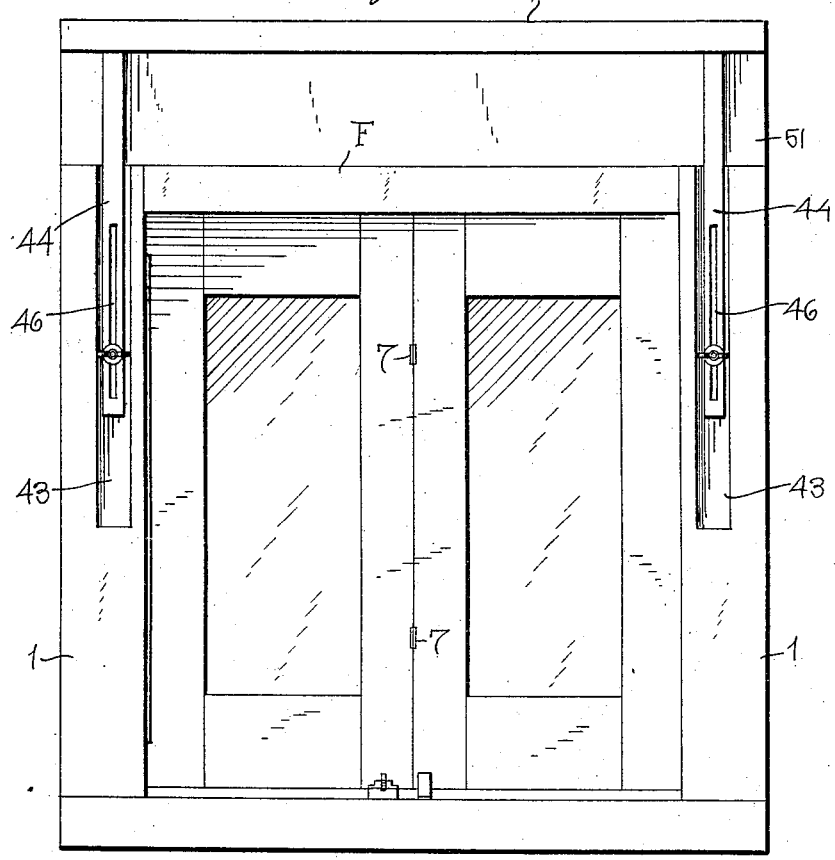
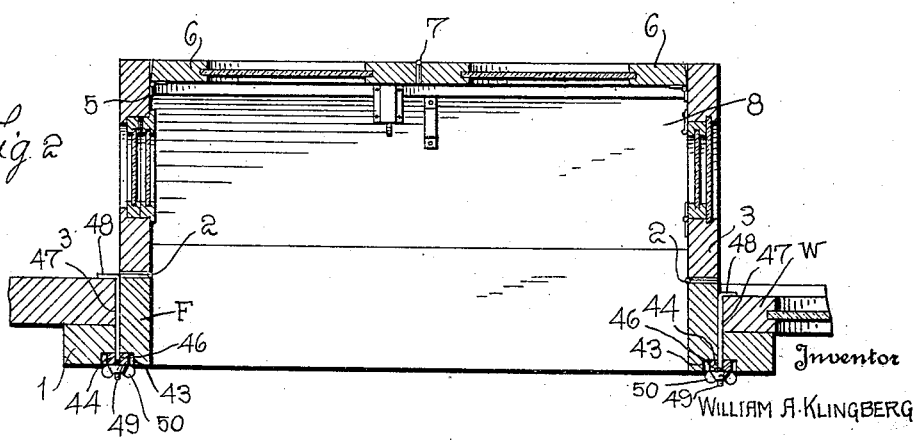
Inventor
WILLIAM A. KLINGBERG
By Watson E. Coleman
Attorney

UNITED STATES PATENT OFFICE.

WILLIAM A. KLINGBERG, OF AFTON, OKLAHOMA.

WINDOW-SHIELD.

1,279,879. Specification of Letters Patent. Patented Sept. 24, 1918.

Application filed October 29, 1917. Serial No. 199,041.

*To all whom it may concern:*

Be it known that I, WILLIAM A. KLINGBERG, a citizen of the United States, residing at Afton, in the county of Ottawa and State of Oklahoma, have invented certain new and useful Improvements in Window-Shields, of which the following is a specification, reference being had to the accompanying drawings.

This invention is an improvement on my Patent No. 1246936, dated November 20, 1917, and it is an object of the present invention to provide novel and improved means whereby the device is effectively held from inward movement when in applied position in the window of a locomotive cab or the like.

It is also an object of the invention to provide a shield of this general character having novel and improved means whereby the space above the main frame of the shield may be closed in such instances when the window of a locomotive cab or the like is of a greater height than the height of the frame of the shield.

The invention consists in the details of construction and in the combination and arrangement of the several parts of my improved window shield wherein certain important advantages are attained and the device rendered simpler, less expensive and otherwise more convenient and advantageous for use, as will be hereinafter more fully set forth.

Figure 1 is a view in rear elevation of a window shield constructed in accordance with an embodiment of my invention; and Fig. 2 is a horizontal sectional view taken through the device as herein embodied, the co-acting side marginal portions of the window being indicated in fragment.

As disclosed in the accompanying drawings the frame F of my improved shield is positioned within the window opening of a locomotive cab or the like and is provided with the outstanding marginal flanges 1 adapted to overlie the adjacent margins of the window opening and having one flange 1 overlying the adjacent end of the cab window W.

Hingedly connected, as at 2 with the vertical stiles or members of the frame F are the end panels 3 adapted to swing inwardly of the frame F. The outer vertical portions of the end panels 3 have hingedly connected to the inner faces thereof as at 5 the side panels 6, said panels 6 being so mounted relatively to the end panels 3 as to have the outer faces of the side panels 6 substantially flush with the outer edges of the end panels 3 when the end panels are in their operative adjustment.

Each of the side panels 6 is of a width substantially equal to one-half of the space between the end panels 3 when extended and the adjacent vertical marginal portions of the side panels 6 are hingedly connected as at 7 to permit the side panels 6 to be drawn inwardly relative to the cab so that the structure afforded by the panels 3 and 6 is substantially retracted within the cab. The inward folding of the panels 3 and 6 is particularly desirable in the event that there is an obstruction adjacent to the trackway with which the shield, when in operative position, may come into contact. 8 denotes the bottom panel operatively engaged with the frame F and which is adapted to fall downwardly by gravity, but is normally maintained in operative position through the medium of a catch co-acting with one of the side panels 6. A complete disclosure of the shield in the present instance is believed to be unnecessary as it is substantially a duplication of what is shown in my patent hereinbefore referred to.

The rear faces of the vertical stiles of the frame F at their upper end portions are provided with the longitudinally disposed grooves 43 open at the top and in which are slidably engaged the elongated vertically disposed arms 44. The upper end portions of the arms 44 are suitably engaged with the cross piece 45 which is adapted to engage or co-act with the upper marginal portion of the window of a cab or the like. The lower end portions of the arms 44 are provided with the longitudinally disposed elongated slots 46. Disposed through the slots 46 and through the window intermediate the frame and a marginal portion of the window opening to the inner marginal portion of the window W are the elongated shanks 47 having their outer end portions angularly disposed as at 48 to overlie the outer faces of the marginal portion of the window opening and the window W, while the inner end portions of said shanks 47 are screw threaded as at 49 and have engaged therewith the winged nuts 50 whereby it will be perceived that the shanks 47 may be caused to hold the frame F in applied position and prevent the same from falling inwardly.

In the event that the window opening should be of a height in excess of the height of the frame F the cross piece 45 is elevated to contact with the upper marginal portion of the window opening and interposed between said cross piece 45 and the top of the frame F is a filler board 51 or the like. By this means it will be at once self evident that the entrance of air or the like over the top of the frame F is effectively prevented. It will also be understood that the winged nuts 50 co-acting with the shanks 47 also serve to maintain the arms 44 in their various adjustments as necessitated by the requirements of practice.

From the foregoing description, it is thought to be obvious that a window shield constructed in accordance with my invention is particularly well adapted for use by reason of the convenience and facility with which it may be assembled and operated and it will also be obvious that my invention is susceptible of some change and modification without materially departing from the principles and spirit thereof and for this reason I do not wish to be understood as limiting myself to the precise arrangement and formation of the several parts herein shown in carrying out my invention in practice except as hereinafter claimed.

I claim:

1. A storm shield including a frame adapted to be seated within a window opening, vertically disposed arms adjustably engaged with the side marginal portions of the frame, a cross member secured to the upper end portions of said arms, and means carried by the frame and co-acting with the arms for holding the arms against movement.

2. A storm shield including a frame adapted to be seated within a window opening, vertically disposed arms adjustably engaged with the side marginal portions of the frame, a cross member secured to the upper end portions of said arms, and means carried by the frame and co-acting with the arms for holding the arms against movement, the means co-acting with each of the arms including a member engageable with a marginal portion of the window opening for holding the frame against movement in one direction through the opening.

3. A storm shield including a frame adapted to be seated within a window opening, vertically disposed arms adjustably engaged with the side marginal portions of the frame, a cross member secured to the upper end portions of said arms, the portions of the arms overlying the frame being slotted, elongated shanks disposed through the frame and through the slots, corresponding end portions of the shanks being angularly disposed, and clamping members co-acting with the opposite end portions of the shanks and contacting with the arms for holding the arms against longitudinal movement, the angular portions of the shanks being adapted to overlie the marginal portions of the window opening for holding said frame against movement in one direction through the opening.

4. A storm shield including a frame adapted to be seated within a window opening, vertically disposed arms adjustably engaged with the side marginal portions of the frame, a cross member secured to the upper end portions of said arms, means carried by the frame and co-acting with the arms for holding the arms against movement, and a filler board insertible between the top of the frame and the cross member when said cross member is elevated relative to the frame.

In testimony whereof I hereunto affix my signature in the presence of two witnesses.

WILLIAM A. KLINGBERG.

Witnesses:
BEN GEORGE,
GEO. M. REEVES.

Copies of this patent may be obtained for five cents each, by addressing the "Commissioner of Patents, Washington, D. C."